United States Patent [19]

Newell

[11] 3,995,508
[45] Dec. 7, 1976

[54] AUTOMATIC BICYCLE TRANSMISSION
[75] Inventor: Harold R. Newell, S. Newbury, N.H.
[73] Assignee: Mesur-Matic Electronics Corporation, Salem, Mass.
[22] Filed: Mar. 31, 1975
[21] Appl. No.: 563,335
[52] U.S. Cl. .................................. 74/244
[51] Int. Cl.² ................... F16H 55/30; F16H 55/54
[58] Field of Search .......... 74/244, 217 B, 217 CV, 74/230.18, 230.23, 335, 337

[56] References Cited
UNITED STATES PATENTS

| 3,867,851 | 2/1975 | Gregory et al. | 74/244 |
| 3,872,736 | 3/1975 | Houvouras | 74/337 |

Primary Examiner—Samuel Scott
Assistant Examiner—Allan R. Burke
Attorney, Agent, or Firm—Pollock, Vande Sande & Priddy

[57] ABSTRACT

The drive ratio of a bicycle transmission is automatically varied through a radially contractible drive chain sprocket wheel assembly that is drivingly coupled to a pedal driven, drive ratio control disk. A force transmitting spring couples the control disk to the sprocket wheel assembly. A fluid-dash-pot device dampens angular oscillation of the control disk relative to the wheel assembly and reduces cyclic fluctuations in the drive ratio.

20 Claims, 10 Drawing Figures

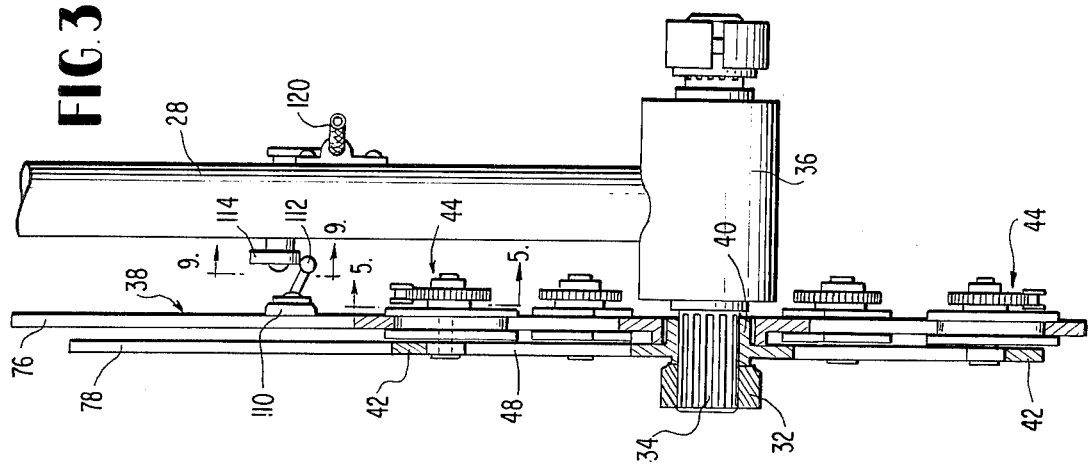
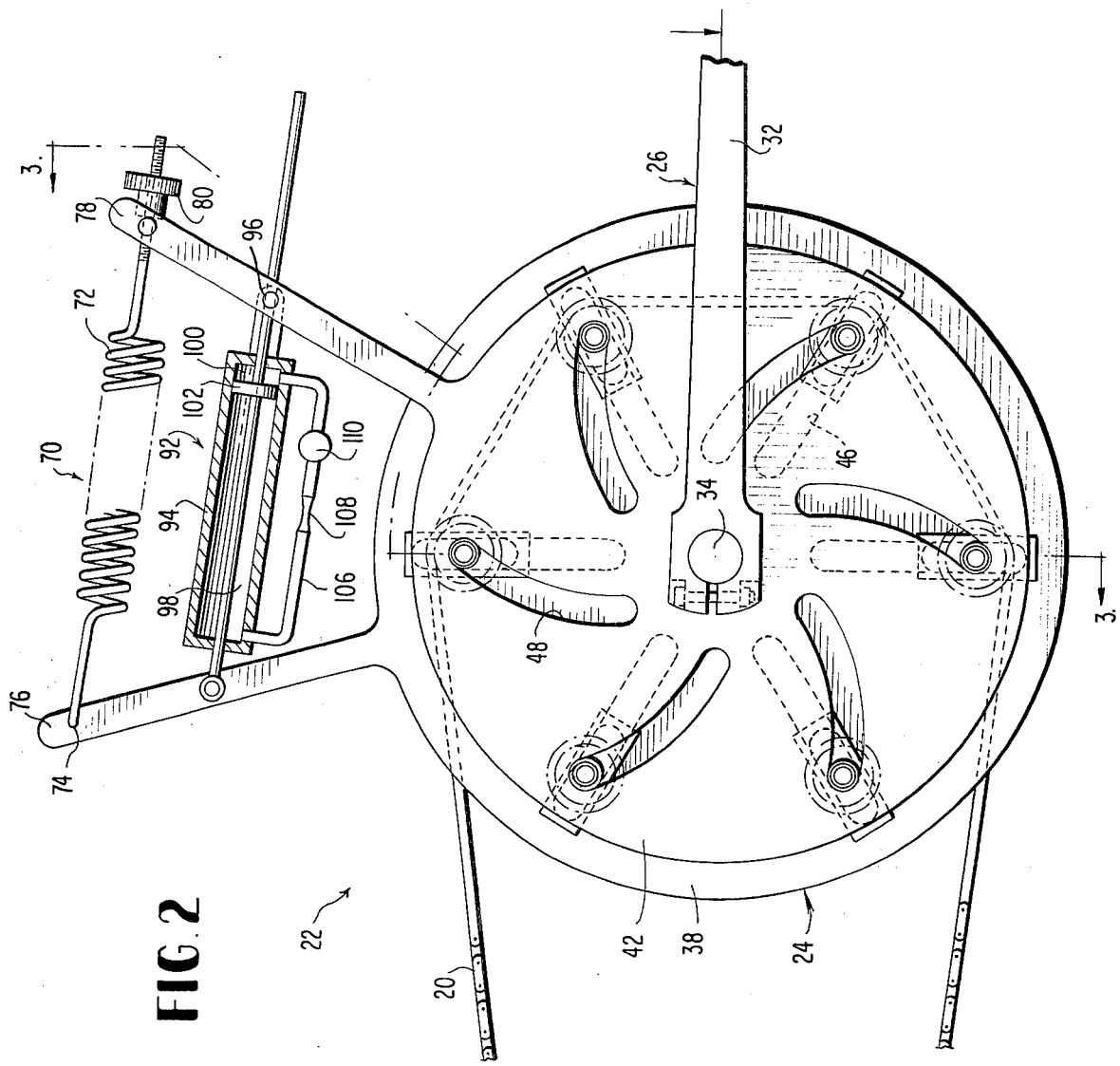

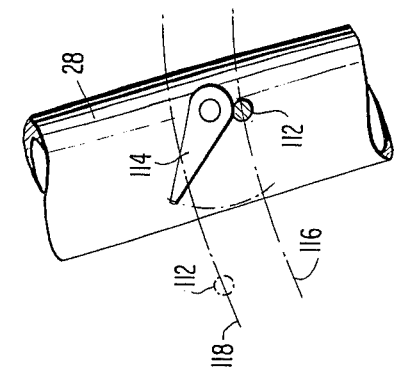
FIG. 10
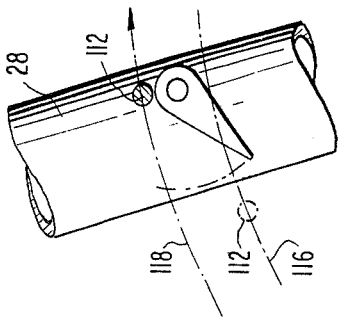
FIG. 9
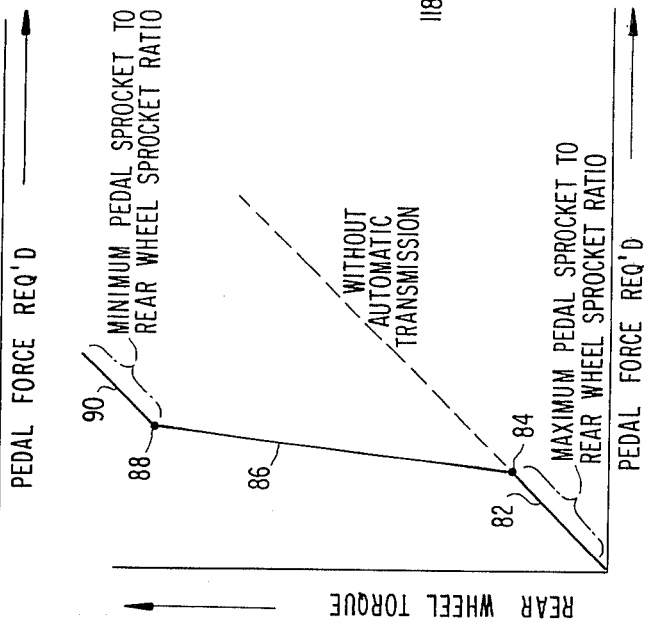
FIG. 8
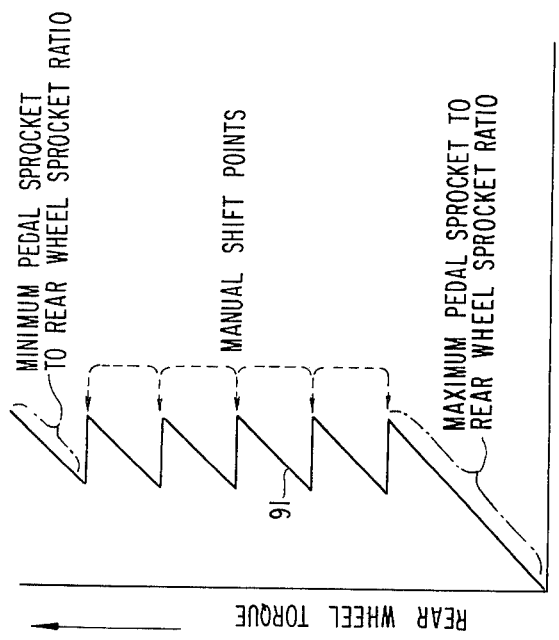
FIG. 7 (PRIOR ART)
5 SPEED DERAILLEUR TRANSMISSION
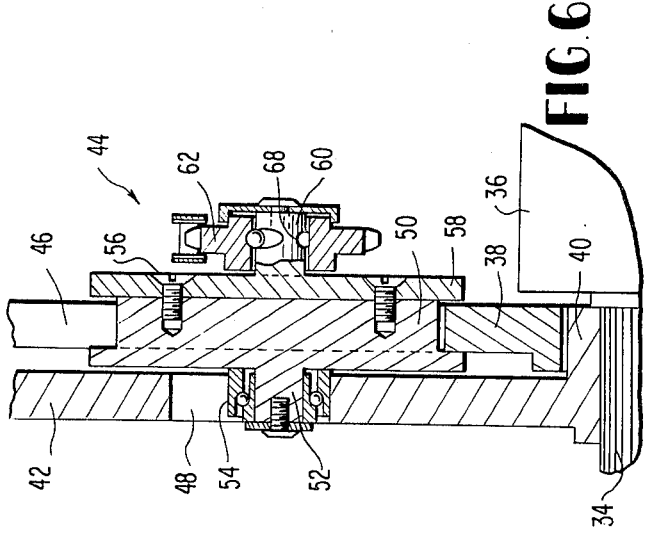
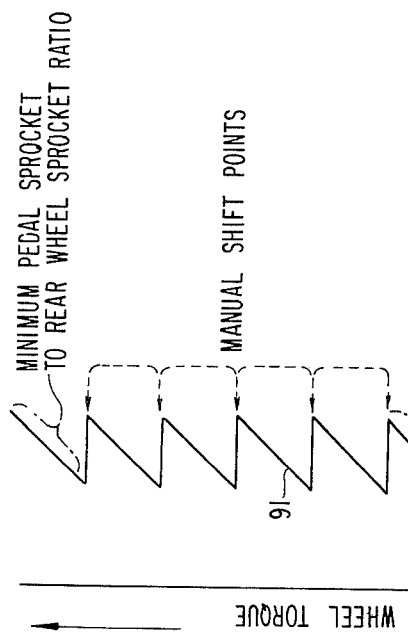
FIG. 5
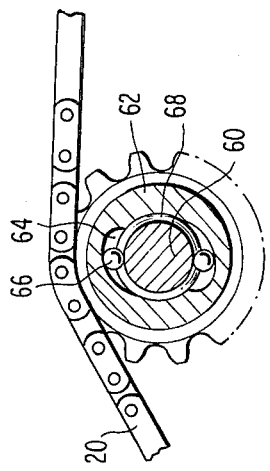
FIG. 6

AUTOMATIC BICYCLE TRANSMISSION

BACKGROUND OF THE INVENTION

This invention relates to an infinitely variable speed transmission of the drive chain sprocket type particularly adapted to bicycles.

Variable speed transmissions for bicycles are of course well known and are generally positioned between the bicycle pedals and the rear wheel in order to change the transmission drive ratio in accordance with the effort required to propel the bicycle. One of the most popular variable speed bicycle transmissions in present use is of the "Derailleur" type wherein the bicycle sprocket chain is "derailed" or shifted between several different size sprockets on the rear wheel in order to effect a change in drive ratio. In this type of variable or plural speed transmission, there is a brief interruption in transmission of torque during each change in drive ratio which is furthermore manually initiated.

Change speed bicycle transmissions of the infinitely variable types are also known wherein a change in drive ratio is effected through a radially expansible or contractible sprocket gear assembly mounted on or driven by the bicycle pedal assembly. Such a variable speed transmission is disclosed for example in U.S. Pat. No. 724,449 to Dumaresq. In the latter type of bicycle transmission, the pedal driven, expansible sprocket wheel has a plurality of sprocket pinions mounted on a wheel plate for radial adjustment to different positions in order to determine the effective drive wheel diameter at which the sprocket pinions engage the sprocket chain. The use of an angularly displaceable control disk having spiral grooves engaging radially displaceable elements on an expansible sprocket wheel in a bicycle transmission, is also known as disclosed in U.S. Pat. No. 598,654 to Cleland. Radially expansible sprocket wheel driving devices for variable speed bicycle transmissions wherein spring means biases the chain engaging sprocket pinions to the maximum drive ratio position, for input torque responsive variation in drive ratio, is also known as disclosed for example in U.S. Pat. No. 2,584,447 to Hayot.

It will be apparent that while the expansible sprocket types of bicycle transmissions provide an infinitely variable drive ratio avoiding the torque transmission interruptions of plural step speed transmissions of the Derailleur type, they are characterized by undesirable cyclic fluctuations in drive ratio not present in a Derailleur type of transmission. Automatically controlled bicycle transmissions of the infinitely variable speed type ordinarily respond to cyclic variations in effort applied through the pedal assembly to cause undesirable oscillations and drive ratio fluctuations. It is therefor an important object of the present invention to provide an automatically controlled bicycle transmission that avoids the drawbacks aforementioned. A further object is to provide a variable speed bicycle transmission wherein the drive ratio changes are effected without interruption in the transmission of torque between the pedals and the rear wheel propelling the bicycle.

SUMMARY OF THE INVENTION

In accordance with the present invention, an expansible drive sprocket wheel assembly is formed by a plurality of sprocket pinions slidably mounted in radial slots formed in a wheel disk, the sprocket pinions being simultaneously biased to radially outer positions and engaging a sprocket chain for transmitting drive at a maximum drive ratio. The radial positions of the sprocket pinions are simultaneously controlled by spiral grooves in a control disk that is angularly displaceable relative to the sprocket pinion carrier disk against the bias of an adjustable spring which urges the sprocket pinions to the radially outer positions aforementioned. The bicycle pedal assembly is connected to the control disk so that torque is transmitted from the pedal assembly to the sprocket carrier disk through the spring. Angular displacement between the sprocket carrier and drive ratio control disks occur against the bias of the spring in response to a varying input torque in order to effect the automatic change in drive ratio. A fluid piston type of damping device is interconnected between the sprocket carrier and control disks in order to modify torque responsive angular displacement by substantially eliminating undesirable drive ratio fluctuations. Toward that end, opposed pressure chambers of the piston device are interconnected by a flow control conduit having a flow restriction therein. A selectively controlled shut off valve is connected in series with the flow restriction and may be actuated in order to completely block flow between the opposite pressure chambers in order to lock the transmission in a selected drive ratio condition.

BRIEF DESCRIPTION OF DRAWING FIGURES

FIG. 2 is an enlarged partial side elevation view of the transmission with parts shown in section.

FIG. 3 is a partial section view taken substantially through a plane indicated by section line 3—3 in FIG. 2.

FIG. 5 is an enlarged partial sectional view taken substantially through a plane indicated by section line 5—5 in FIG. 3.

FIG. 6 is an enlarged partial sectional view taken substantially through a plane indicated by section line 6—6 in FIG. 4.

FIG. 7 is a graphical illustration of the output torque characteristics associated with prior bicycle transmissions.

FIG. 8 is a graphical illustration of output torque characteristics associated with the transmission of the present invention.

FIG. 9 is a partial sectional view taken substantially through a plane indicated by section line 9—9 in FIG. 3, showing a valve control arrangement for locking the transmission in one drive ratio.

FIG. 10 is a sectional view similar to that of FIG. 9 showing the valve control in its other respective position.

DETAILED DESCRIPTION OF A SPECIFIC EMBODIMENT

Figure 1:
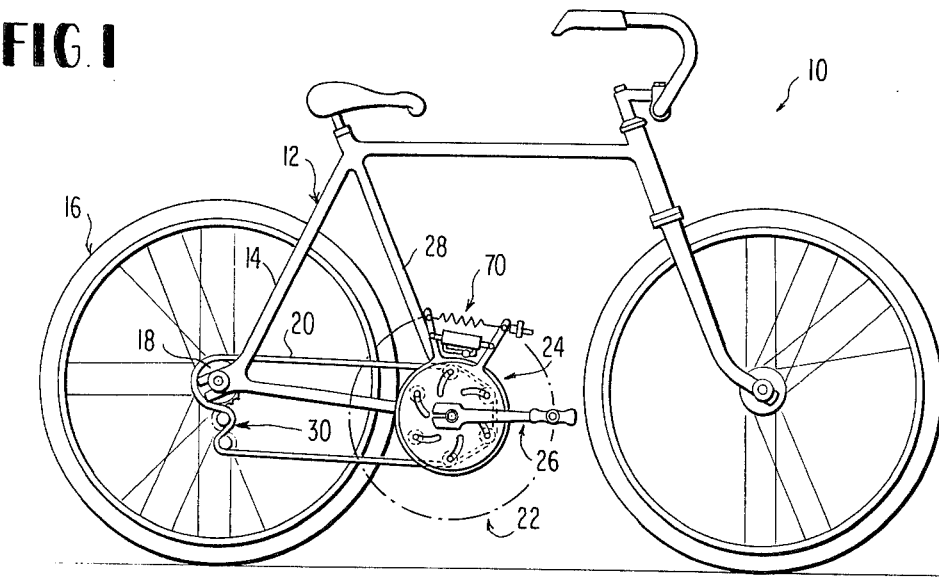
FIG. 1 is a side elevational view of a typical bicycle with the automatic transmission of the present invention installed.

Referring now to the drawings in detail, FIG. 1 illustrates a typical bicycle generally referred to by reference numeral 10. The bicycle includes the usual frame generally referred to by reference numeral 12 including the rear frame post 14 supporting the rear bicycle propelling wheel 16 and the driven sprocket wheel 18 to which it is connected and about which an endless drive sprocket chain 20 is entrained. The sprocket chain 20 forms part of the automatically controlled, infinitely variable transmission generally referred to by reference numeral 22 which includes an expansible wheel assembly 24 about which the a sprocket chain is entrained. The sprocket wheel assembly 24 as well as the usual pedal assembly 26, are rotatably supported forwardly of the rear wheel 16 by the frame post 28 of the frame assembly. A sprocket chain slack take-up device 30 of a well known type such as those associated with Derailleur transmissions, is suspended from the axle associated with the driven sprocket 18. The sprocket chain 20 is entrained through the take-up device 30 in order to maintain the sprocket chain in a properly tensioned condition under all drive ratio conditions of the transmission. The drive ratio is automatically varied in response to changes in input torque or effort exerted by the cyclist through the pedal assembly 26.

Referring now to FIGS. 2 and 3 in particular, the pedal assembly 26 includes the usual pedal arms 32 splined to opposite ends of a pedal shaft 34 that is journaled in a bearing assembly enclosed within the bearing sleeve 36 connected to the lower end of the frame post 28. The drive sprocket wheel assembly 24 includes a drive wheel disk 38 rotatably mounted on the pedal shaft 34. The disk 38, as more clearly seen in FIG. 3, is loosely mounted on a hub 40 that is splined to the pedal shaft 34. The hub 40 is integral with a control disk 42 disposed in close axial spaced relation to the drive wheel disk 38. The control disk 42 is accordingly fixed to the pedal assembly for rotation therewith and is in operative engagement with a plurality of sprocket pinion assemblies 44 carried by the drive wheel disk 38. A plurality of radial slots 46, such as the six slots shown equi-angularly spaced from each other, are formed in the drive wheel disc 38. Each of the radial slots 46 is intersected by a corresponding spiral slot 48 formed in the control disk 42. The sprocket pinion assemblies 44 are slidably mounted on the drive wheel disk 38 by means of the radial slots 46 and engage the control disk 42 through the spiral slots 48. Thus, the radial positions of the sprocket pinion assemblies 44 will be controlled by the relative angular positions of the drive wheel disk 38 and control disk 42.

As more clearly seen in FIG. 6, each sprocket pinion assembly 44 includes a slide member 60 received within a radial slot 46 in order to constrain its movement on the drive wheel disk 38. A pin formation 52 projects axially from the slide member 50 into an associated spiral groove 48 in the control disc 42. A bearing assembly 54 is mounted on the pin formation 52 for anti-friction engagement with the control disk 42. Secured to the slide member 50 by fasteners 56 on the axial side opposite the pin formation 52, is a bearing disk 58 from which a bearing pin 60 projects in co-axial alignment with the pin formation 52. A relatively small sprocket gear 62 is supported on the bearing pin 60 and is formed internally with pockets 64 as more clearly seen in FIG. 5. One-way clutch elements 66 are retained in the pockets 64 and ride in a groove 68 formed on the bearing pin 60. The sprocket 64, elements 66 and groove 68 form a one-way clutch of the ball wedging type.

It will be apparent from the foregoing description with reference to FIGS. 2, 3, 5 and 6, that the sprocket chain 20 is drivingly engaged with the drive wheel disk 38 through the sprocket gears 62 at an effective diameter determined by the radial positions of the sprocket pinion assemblies 44 on the drive wheel disk. The radial positions of the sprocket pinion assemblies are simultaneously adjusted by angular displacement of the control disk 42 relative to the drive control disk 38. Since the distance between the sprocket gears 62 at chain engaging locations along the sprcket chain varies with changes in effective sprocket wheel diameter, rotation of the sprocket gears 62 in one direction is permitted by means of the one-way clutch elements 66 to accommodate such changes. Transfer of the driving torque from the chain to the sprocket gears 62 occurs gradually as each successive sprocket gear 62 is brought into contact with the chain. Thus, as each successive sprocket gear is initially brought into contact, its rotational position is adjusted slightly so as to accommodate its spacing relative to the sprocket gear 62 then already in contact with chain so as to take into account the pitch of the chain. Such slight adjustment can readily be made prior to the time that the successive sprocket gear 62 assumes any substantial part of the load. In this way, the transfer of torque occurs gradually. The one-way clutch elements will, however, lock the sprocket gears 62 against rotation in the other direction in order to transmit torque from the drive wheel disk 38 to the sprocket chain 20. Torque is in turn transmitted to the drive wheel disk 38 from the pedal assembly by means of the control disk 42 and a force transmitting spring device generally referred to by reference numeral 70.

Figure 4:
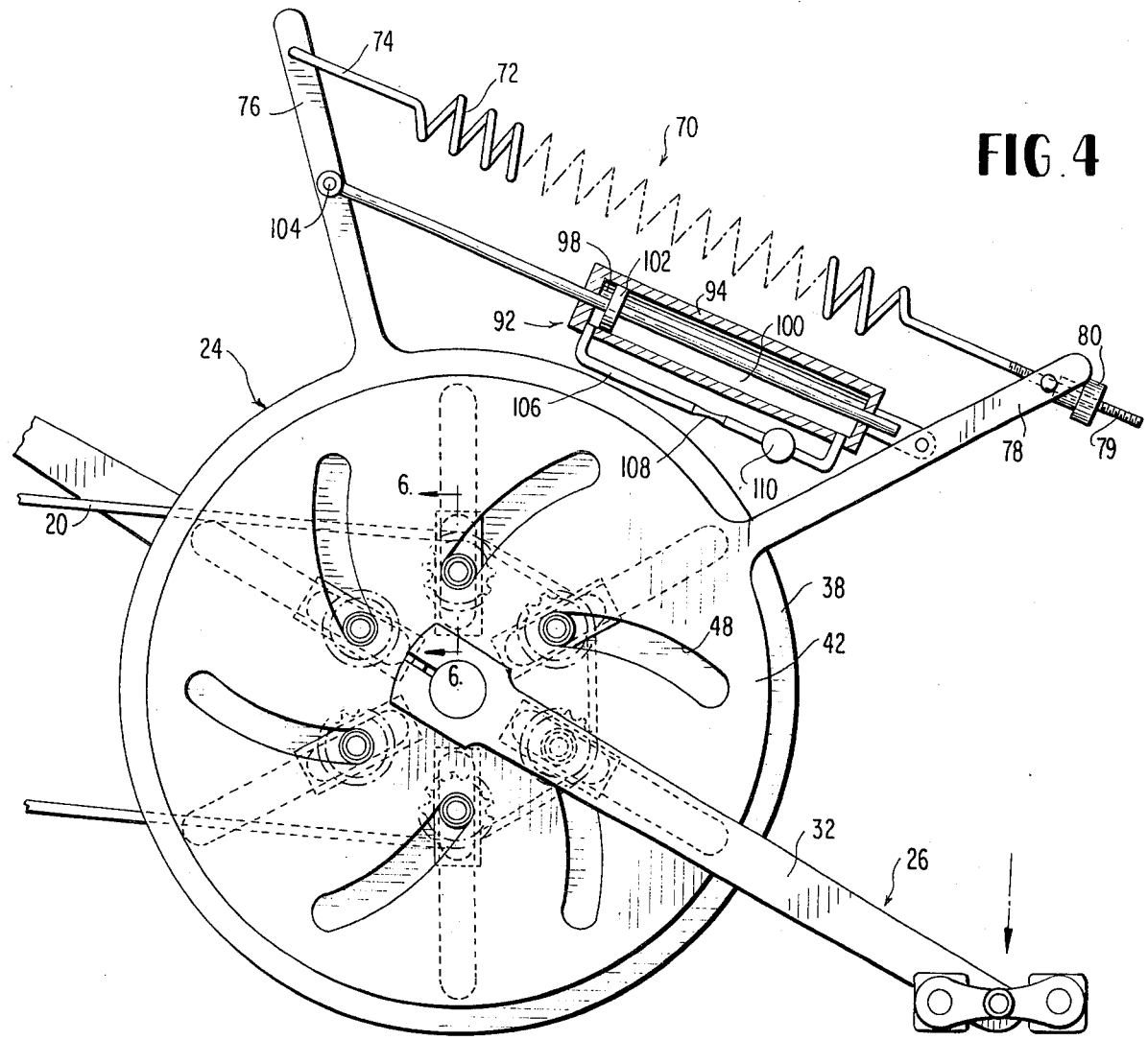
FIG. 4 is a partial side elevation view similar to FIG. 2 but showing the transmission in another drive ratio condition.

As more clearly seen in FIG. 2, the spring device 70 includes a tension coil spring 72 having one end 74 anchored to an arm 76 projecting radially from the drive wheel disk 38 in angularly spaced relationship to a radial arm 78 projecting from the control disk 42. The other axial end 79 of the spring 72 is threaded and anchored to the arm 78 by means of a tension adjusting nut 80. Thus, the spring device 70 will directly transmit rotational movement of the pedal assembly and control disk 42 to the drive wheel disk 38 until a predetermined torque is exceeded at which point the spring will yield. A corresponding relative angular displacement between the drive wheel disk 38 and control disk 42 ensues causing the sprocket pinion assemblies 44 to be radially contracted or displaced inwardly from the radially outer positions shown in FIG. 2 to which the sprocket pinion assemblies are biased by the spring device 70. The extent to which the input torque exceeds the spring resisting force will determine the effective diameter of the drive sprocket wheel assembly, this effective diameter varying from the maximum value as illustrated in FIG. 2 to a minimum value as illustrated in FIG. 4.

In the radially outer positions of the sprocket pinion assemblies 44, motion is transmitted from the pedal assembly to the rear wheel of the bicycle at a maximum high drive ratio. As the effort required to propel the bicycle is increased, the drive ratio is decreased by contraction of the expansible drive sprocket wheel assembly 24 against the bias of spring device 70 until a minimum drive ratio is attained corresponding to the minimum diameter position of the sprocket pinion assemblies as shown in FIG. 4. The graph in FIG. 8 depicts a curve section 82 of the output torque curve corresponding to the maximum drive ratio aforementioned. As the pedal effort required increases beyond a predetermined point 84 as shown in FIG. 8, determined by the setting of adjustment nut 80, the drive ratio begins to decrease along curve section 86 until limit point 88 is reached. The drive ratio will then be at the minimum value as aforementioned depicted along curve section 90 in FIG. 8. The output torque characteristic is continuous along curve section 88 in accordance with the present invention as compared to the discontinuous curve sections 91 depicted in the prior art output torque curve graphically illustrated in FIG. 7. A smooth curve section 86 is obtained, however, because of the force modifying effect of a fluid damping or dash-pot device 92 as shown in FIGS. 2 and 4.

It will be appreciated that there is a cyclic variation in the torque applied through the pedal assembly by a cyclist. When the pedal arms are horizontal, the torque applied by the legs of the cyclist is maximum while the torque is minimum when the pedal arms are in the vertical position during each revolution of the pedal assembly. Thus, an appreciable cyclic fluctuation in drive ratio would ordinarily occur as the average drive ratio varies along curve section 86 as depicted in FIG. 8, if not for the effect of the damping device 92. The damping device is operative to dampen relative oscillation of the drive wheel and control disks 38 and 42 caused by the cyclically fluctuating input torque applied to control disk 42 through the pedal assembly. The damping device includes a fluid pressure cylinder 94 pivotally anchored at one axial end by an anchor pin 96 to the arm 78. The cylinder is internally divided into opposed pressure chambers 98 and 100 by a piston 102. A piston rod connected to the piston slidably extends through sealed openings at both opposite ends of the cylinder to volumetrically equalize the opposed pressure chambers 98 and 100. The piston rod is pivotally anchored at one end by pin 104 to the arm 76. A suitable, non-compressible fluid filling the chambers 98 and 100 is displaced between the chambers by the piston in response to relative angular displacement of the arms 76 and 78 to which the piston rod and cylinder are respectively anchored. Fluid displacement is accommodated by a flow control circuit 106 interconnecting opposite end portions of the cylinder. A flow restrictor 108, which may be adjustable, is positioned in the conduit to restrict flow and thereby regulate the damping effect by retarding relative angular displacement to substantially reduce cyclic oscillations in magnitude and the corresponding fluctuations in drive ratio. The foregoing operation of the damping device 92 is in effect as long as shut-off valve 110 is opened, the valve 110 being connected in series with restrictor 108 as schematically shown in FIGS. 2 and 4.

The valve 110 when closed will block flow through conduit 106 to thereby render device 92 operative to lock the disks 38 and 42 to each other at some relative angular position corresponding to some drive ratio condition of the transmission. Suitable control means is therefore provided for selectively opening or closing the valve 110.

As more clearly seen in FIG. 3, the valve 110 is provided with a toggle type valve actuator 112 in the illustrated embodiment through which the valve may be displaced between its open and closed positions. In order to selectively actuate the valve while it is being rotated with the disks 38 and 42 during movement of the bicycle, a deflector element 114 is mounted in the frame post 28 for pivotal displacement between two operative positions as respectively shown in FIGS. 9 and 10. In the open position of the valve 110, the end of actuator 112 will move along path 116 while in the closed position it will move along path 118. Thus, in the upper position of deflector 114 shown in FIG. 9, the deflector intersects path 118 to displace the valve actuator to the valve open position. In the lower position of the deflector shown in FIG. 10, the deflector intersects path 116 to cam the valve actuator to the closed position. The deflector 114 may be displaced between its two operative positions by a Bowden wire control cable 120 as shown in FIG. 3 which extends to a suitable manual control (not shown) mounted for example on the handle bar of the bicycle. In this fashion, the cyclist may lock the transmission in any drive ratio condition attained.

In summary, the drive sprocket wheel assembly 24 formed by the control disk 42, drive wheel carrier disk 38 and sprocket pinion assemblies 44 initially transmits torque from the pedal assembly 26 to the rear wheel at a high drive ratio. When a predetermined input torque is exceeded, the drive ratio is decreased by an amount corresponding to radial contraction of the effective diameter of the drive sprocket wheel assembly against the bias of spring device 70 through which torque is transmitted from the disk 42 to the disk 38. The fluid damping device 92 interconnected between the disks in parallel relation to the spring device 70 dampens cyclic oscillation of the disks relative to each other to reduce cyclic fluctuation of the drive ratio to a negligible magnitude as compared to the cyclic variation in input torque normally applied to the pedal assembly. This results in a substantially smooth variation in drive ratio as a function of the average torque applied each revolution of the pedal assembly. At any time during operation, the transmission may be locked at the drive ratio condition attained by closing the valve 110 associated with the damping device 92. Valve closing may be manually effected in a manner described hereinbefore and/or automatically effected in response to abrupt cessation of the pedalling effort by the cyclist.

What I claim is:

1. In combination with a variable drive ratio transmission having a drive wheel, a flexible drive chain, chain engaging means mounted on the drive wheel for transmitting force between the drive wheel and the drive chain and cyclically variable input torque means for imparting rotation to the drive wheel, the improvement including torque responsive control means connecting the drive wheel to the input torque means for biasing the chain engaging means to a drive ratio limit position, and force modifying means connected to the drive wheel for substantially reducing cyclic fluctuations in drive ratio produced by the input torque means.

2. The combination of claim 1, wherein said input torque means comprises a bicycle pedal assembly.

3. The combination of claim 2, wherein said chain engaging means comprises a plurality of sprocket pinions mounted for radial displacement on the drive wheel.

4. The combination of claim 3, including one-way clutch means drivingly coupling each of the sprocket pinions to the drive wheel for rotation in one direction relative thereto to accomodate variations in spacing between the sprocket pinions along the drive chain.

5. The combination of claim 4, wherein said torque responsive control means includes a control member connected to the input torque means and drivingly connected to the chain engaging means, and spring means interconnecting the drive wheel and the control member for angularly biasing the same relative to each other to radially displace the chain engaging means radially outwardly to said drive ratio limit position.

6. The combination of claim 5, wherein said force modifying means includes a dash-pot device interconnected between the drive wheel and the control member for damping relative angular displacement between the drive wheel and the control member.

7. The combination of claim 6, wherein said dash-pot device includes fluid piston means having opposed pressure chambers and flow control means interconnected between said chambers.

8. The combination of claim 7, wherein said flow control means includes a flow restriction element connected in series with a flow conducting shut-off valve.

9. The combination of claim 8, including selective control means connected to the shut-off valve for locking the transmission in any desired drive ratio.

10. The combination of claim 1, wherein said chain engaging means comprises a plurality of sprocket pinions mounted for radial displacement on the drive wheel.

11. The combination of claim 10, including one-way clutch means drivingly coupling each of the sprocket pinions to the drive wheel for rotation in one direction relative thereto to accomodate variations in spacing between the sprocket pinions along the drive chain.

12. The combination of claim 1, wherein said torque responsive control means includes a control member connected to the input torque means and drivingly connected to the chain engaging means, and spring means interconnecting the drive wheel and the control member for angularly biasing the same relative to each other to radially displace the chain engaging means radially outwardly to said drive ratio limit position.

13. The combination of claim 12, wherein said force modifying means includes a dash-pot device interconnected between the drive wheel and the control member for damping relative angular displacement between the drive wheel and the control member.

14. The combination of claim 13, wherein said dash-pot device includes fluid piston means having opposed pressure chambers and flow control means interconnected between said chambers.

15. The combination of claim 14, wherein said flow control means includes a flow restriction element connected in series with a flow conducting shut-off device.

16. The combination of claim 15, including selective control means connected to the shut-off valve for locking the transmission in any desired drive ratio.

17. In a variable speed transmission having a means including a sprocket wheel supporting thereon a plurality of radially contractible sprocket drive members and control means displaceable relative to the sprocket wheel for varying the radial position of said sprocket drive members, means for regulating said variation in the drive ratio comprising damping means for substantially reducing cyclic fluctuations in the drive ratio and drive ratio lock means connected to the damping means for locking the transmission at a selected drive ratio.

18. In a variable speed transmission having a pair of drive transmitting members mounted for limited displacement relative to each other and means responsive to the relative displacement between said drive transmitting members for varying the ratio between the input torque applied to one of said drive transmitting members relative to the output torque provided by the other of said drive transmitting members to a rotating means and spring means interconnected between said members for biasing the same to a drive ratio limiting position, means for regulating variation in drive ratio of the transmission including means connected between said drive transmitting members for damping said relative displacement to substantially reduce cyclic fluctuation in the drive ratio, and drive ratio lock means connected to said regulating means for locking the transmission at a selected drive ratio.

19. The combination of claim 18, wherein said damping means includes fluid piston means having opposed pressure chambers and flow control means interconnected between said chambers.

20. The combination of claim 19, wherein said flow control means includes a flow restriction element connected in series with a flow conducting shut-off valve.

* * * * *